Patented Aug. 7, 1928.

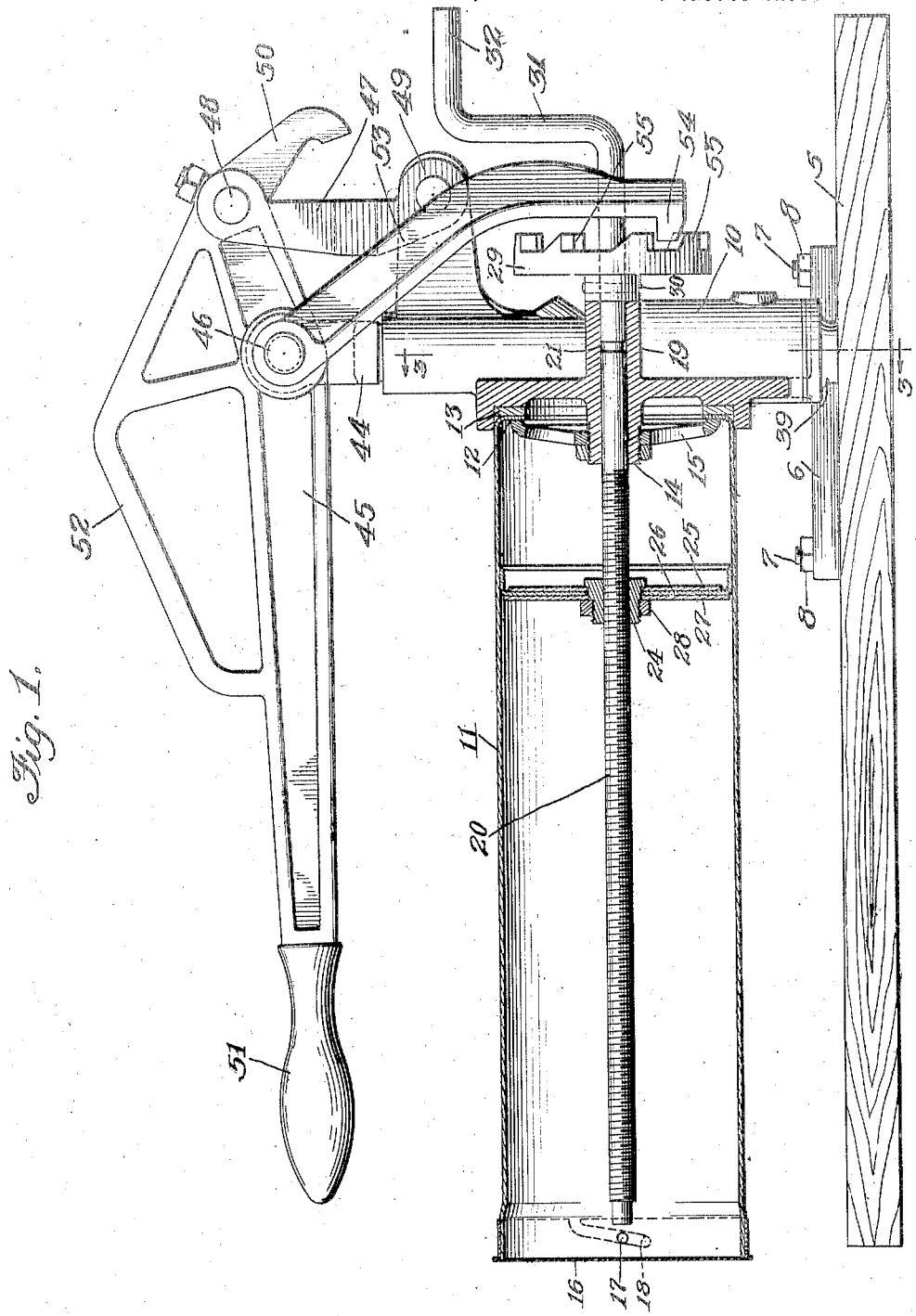

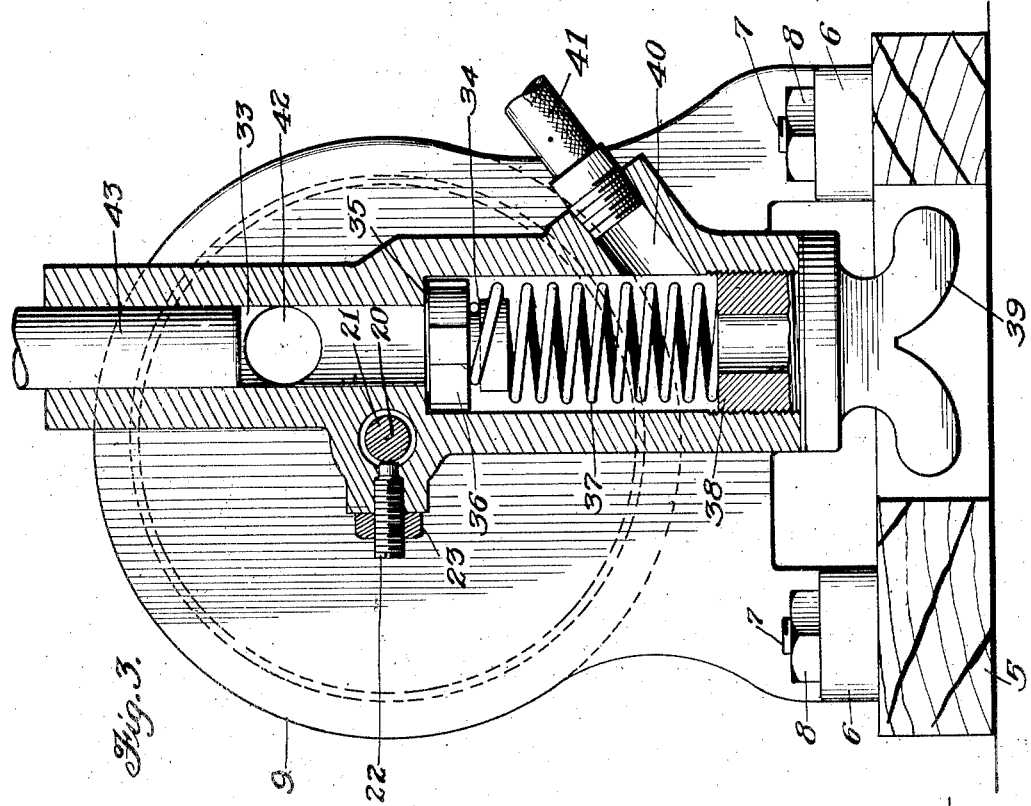
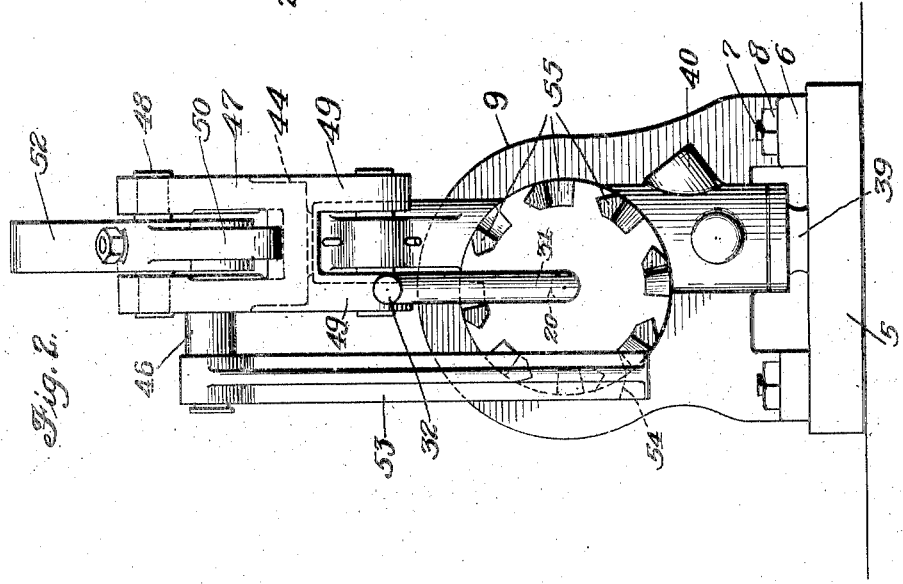

1,679,855

UNITED STATES PATENT OFFICE.

ERNEST W. DAVIS, OF OAK PARK, ILLINOIS, ASSIGNOR TO THE BASSICK MANUFACTURING COMPANY, OF CHICAGO, ILLINOIS, A CORPORATION OF DELAWARE.

LUBRICANT COMPRESSOR.

Application filed November 10, 1924. Serial No. 748,956.

My invention relates to improvements in lubricant compressors and is particularly concerned with the provision of a novel type of lubricant compressor adapted to deliver comparatively large quantities of lubricant under comparatively high pressure.

The objects of my present invention are:

First, to provide a lubricant compressor comprising a low pressure container, or cylinder, a high pressure cylinder, means for displacing the lubricant from the low pressure cylinder into the high pressure cylinder, and other means for expelling the lubricant from the high pressure cylinder;

Second, to provide a compressor, of the character described, comprising means for positively displacing the lubricant from the low pressure cylinder into the high presure cylinder; and Third, to provide a compressor, such as described, that is simple in construction, economical to manufacture and easy to operate.

Other objects of my invention will appear as this description progresses, reference being had to the accompanying drawings, in which Figure 1 is a central, longitudinal section through one embodiment of my invention;

Figure 2 is an end elevation, partially in section; and

Figure 3 is a transverse section taken on line 3—3 of Figure 1, this section being on an enlarged scale.

Referring to the drawings, my improved compressor comprises a suitable bed plate 5, of wood or any other desired material, to which is secured the base plate 6 by means of bolts 7 and nuts 8.

Projecting upwardly from the base plate 6, and preferably formed integrally therewith, is a hollow casting, comprising the substantially disc-shaped part 9 and the cylindrical part 10. The disc-shaped part 9 has a circular depression formed in one face thereof for receiving one end of the low pressure cylinder 11. The inner end of this cylinder is flanged inwardly, as shown at 12, and bears against a gasket 13 seated in the depression in the member 9. This member has a centrally disposed, hollow, inwardly extending, exteriorly threaded boss 14, onto which is threaded the spider 15, the edge of which engages the flange 12 and clamps it and the gasket 13 to the disc-shaped part 9. The disc-shaped part 9 acts as a closure for one end of the low pressure cylinder 11. The opposite end of this cylinder is closed by a suitable cap 16 that may be secured thereto by means of a pin and slot connection formed by the pin 17 and the bayonet slot 18, or in any other desirable manner.

A hollow boss 19 extends outwardly from the disc-shaped member 9 and it and the hollow boss 14 form a bearing for the unthreaded portion of the threaded piston rod 20. An annular groove 21, formed in the piston rod 20, and the inner end of the set screw 22 prevent longitudinal movement of the piston rod 20 relatively to the other parts of the compressor. A lock nut 23 may be used for locking the set screw 22 in place.

An interiorly threaded sleeve 24 is threaded upon the piston rod 20 and has assembled thereon the face plate 25, the cup leather 26 and the follower plate 27. These elements are clamped upon the sleeve by means of the nut 28 and altogether form a piston that is reciprocable longitudinally of the low pressure cylinder.

A crown ratchet wheel 29 is secured to the piston rod 20 just outside the hollow boss 19. A pin 30, extending through the hub of the ratchet wheel, secures the latter to the threaded piston rod 20. The extreme outer end of the piston rod 20 is bent laterally, as shown at 31, and then bent so as to provide a handle portion 32 extending substantially parallel with the threaded piston rod 20, by means of which the latter can be rotated to move the piston described above in either direction. The principal function of this handle is, however, to move the piston to a position where it is disengaged from the inner end of the piston rod so that it can be removed through the open end of the low pressure cylinder to permit the latter to be filled with lubricant.

The cylindrical portion 10 has a vertical bore extending therethrough, forming the high pressure cylinder 33 and the valve chamber 34. The diameter of the valve chamber is greater than that of the high pressure cylinder 33 and thus forms a valve seat 35, against which the valve 36 is held by means of the compression spring 37. The outer end of this compression spring bears against one end of the threaded plug 38 that closes the lower end of the valve chamber. This plug is preferably provided with wings 39, by means of which it can be removed when desired. The valve 36 is polygonal in cross section, as indicated in Figure 3, so as to provide clearance spaces between its periphery and the walls of the valve chamber through which the lubricant expelled from the high pressure cylinder 33 can be discharged. The lubricant passes from the valve chamber 34 through the discharge port 40. It can be conducted from this port to any desired point by means of the discharge conduit 41, the inner end of which threads into the discharge port 40, or by any other desired means.

The high pressure cylinder 33 communicates with the low pressure cylinder through the intake port 42 and lubricant is discharged from the high pressure cylinder by the reciprocable plunger 43, the upper end of which is bifurcated. The bifurcations 44 engage opposite sides of the lever 45 and are preferably secured thereto by means of the pin 46. The lever 45 is mounted upon the link 47 by means of the pivot pin 48. The lower end of the link 48 is pivotally mounted upon the outer end of the bracket 49 that extends outwardly from the upper end of the cylindrical member 10. An extension 50 of the lever 45 is adapted to engage the front face of the link 47 and thus limit the upward movement of the lever and the plunger 43. The lever 45 is provided with a handle 51, by means of which it can be oscillated, and with a truss arch 52 that stiffens the lever 45 and at the same time serves as a handle, by means of which the compressor can be carried from place to place. The pivot pin 46 extends outwardly past one of the bifurcations 44 and carries, at its outer end, the pawl 53 that is provided with a projection 54 for engaging the teeth 55 of the ratchet wheel 29. This pawl is rotatably mounted on the pin 46 and is offset from a vertical plane, as shown in Figure 1, so that gravity tends to hold it in position to engage the teeth of the ratchet wheel 29.

From the above description it will be apparent that when the handle 51 is moved upwardly, the port 42 is uncovered, thereby permitting lubricant, that has previously been placed under pressure by the movement of the piston in the low pressure cylinder, to be forced into the high pressure cylinder through the port 42. The upward movement of the handle 51 is accompanied by a corresponding upward movement of the pin 46 and the pawl 53. The engagement by the projection 54 of the pawl with one of the teeth 55 causes the ratchet wheel to be rotated and the piston in the low pressure cylinder to be advanced toward the high pressure cylinder, thereby placing the lubricant in the low pressure cylinder under sufficient pressure to force it into the high pressure cylinder.

Upon pushing downwardly upon the handle 51, the plunger 43 first closes the inlet port 42 and then displaces the lubricant from the high pressure cylinder into the valve chamber 34 and from the latter out through the discharge conduit 41. The downward movement of the handle 51 causes the pawl 53 to move into the position where the projection 54 can engage the nearest the succeeding upward movement of the handle 51, the piston in the low pressure cylinder will again be advanced to place the lubricant therein under pressure.

While I have described the details of construction of the preferred embodiment of my invention, it is to be clearly understood that my invention is not limited to these details, but is capable of other adaptations and modifications within the scope of the appended claims.

Having thus described my invention, what I claim is:

1. A lubricant compressor comprising a low pressure cylinder, a closure for one end of said low pressure cylinder, a high pressure cylinder receiving material from said low pressure cylinder formed integrally with said closure and disposed eccentrically of said low pressure cylinder, a threaded piston rod rotatably mounted in said closure and extending substantially the entire length of said low pressure cylinder, a piston threaded onto said piston rod, a ratchet wheel secured to the outer end of said piston rod, a plunger reciprocably mounted in said high pressure cylinder, a lever for reciprocating said plunger, and a pawl having one end pivotally mounted upon said lever and its other end positioned to engage the teeth on said ratchet wheel.

2. A lubricant compressor comprising a low pressure cylinder, a closure for one end low pressure cylinder, a high pressure cylinder, a threaded piston rod rotatably mounted in said closure and extending substantially the entire length of said low pressure cylinder, a piston threaded onto said piston rod, a ratchet wheel secured to the outer end of said piston rod, a plunger reciprocably mounted in said high pressure cylinder, a lever for reciprocating said plunger, and a pawl having one end pivotally mounted upon said lever and its other end positioned to engage the teeth on said ratchet wheel.

3. A lubricant compressor comprising a low pressure cylinder, a transverse high pressure cylinder at one end of said low pressure cylinder receiving material from said low pressure cylinder, compressing means in said low pressure cylinder including a central axial rotatable piston rod projecting out of the end of said cylinder past said high pressure cylinder, high pressure compressing means in said high pressure cylinder, and a mechanical interconnection between said high pressure compressing means and the projecting end of said rod, said rod having an offset end portion forming a handle.

4. A lubricant compressor comprising a high pressure cylinder body having a high pressure cylinder formed therein, said body having a transverse bore lying in a plane perpendicular to said high pressure cylinder and extending past beside the same, a piston rod in said transverse bore, a low pressure cylinder at one end of said piston rod discharging into said high pressure cylinder, a low pressure piston in said cylinder actuated by said rod, high pressure compressing means in said high pressure cylinder, and a transmission from said high pressure compressing means to the other end of said piston rod, said transmission including externally accessible means for connecting and disconnecting it.

5. A lubricant compressor comprising a body forming a high pressure cylinder and a closure member, said closure member lying in a plane parallel to but offset from the axis of said high pressure cylinder, a central boss on said closure member, a low pressure cylinder having a flanged end concentric with said boss, a spider fastened on said boss for clamping said flanged end to said closure member, a low pressure piston rod extending through and journaled in said boss, and compressing means actuated by said rod, said low pressure cylinder discharging into said high pressure cylinder.

6. A lubricant compressor comprising a closure, a cylinder clamped to said closure, a piston rod extending axially through said closure and inside said cylinder, a piston in said cylinder actuated by said rod, means for expelling the contents of said cylinder by rotating said rod to move said piston toward said closure, and means permitting withdrawal of said piston at the end opposite said closure to refill the cylinder.

7. A lubricant compressor comprising a cylinder, a piston rod and piston in said cylinder, intermittent drive means at one end of said cylinder for moving said rod and piston, high pressure discharge means for delivering the contents expelled from said cylinder upon movement of said piston toward said drive means, and means permitting withdrawal of said piston at the end opposite said drive means to refill the cylinder.

8. A lubricant compressor comprising a cylinder, a piston rod and piston in said cylinder, drive means at one end of said cylinder for moving said rod and piston, discharge means for high pressure delivery of the contents forced from said cylinder upon movement of said piston toward said drive means, and means permitting withdrawal of said piston from said rod at the end opposite said drive means to refill the cylinder.

9. A lubricant compressor comprising a container, means for compressing the contents thereof, an operating lever for said compressing means extending across above said means and said container, interengaging stops on said lever and a part attached to said container, and a stiffening truss for said lever forming a handle for carrying the entire device.

10. A lubricant compressor comprising a container, means for compressing the contents thereof, an operating lever for said compressing means, interengaging stops on said lever and a part attached to said container, and a stiffening truss for said lever forming a handle for carrying the entire device.

11. A compressor comprising a low pressure cylinder, a transverse high pressure cylinder, communicating with said low pressure cylinder, a plunger in said high pressure cylinder, an operating lever parallel to said low pressure cylinder, a pintle connecting said lever and plunger, a gravity pawl carried by said pintle, a rotatable ratchet driven by said pawl, a piston rod co-axial with said low pressure cylinder and supporting said ratchet, and a piston in said low pressure cylinder threaded on said rod.

12. A compressor comprising a low pressure cylinder, a high pressure cylinder, communicating with said low pressure cylinder, a plunger in said high pressure cylinder, a gravity pawl operatively connected to said plunger, a rotatable ratchet driven by said pawl, compressing means in said low pressure cylinder, and a transmission from said ratchet to said compressing means.

13. A compressor comprising a low pressure cylinder, a transverse high pressure cylinder, communicating with said low pressure cylinder, a plunger in said high pressure cylinder, an operating lever parallel to said low pressure cylinder for moving said plunger, a pawl carried by said lever, compressing means in said low pressure cylinder, and a transmission from said pawl to said compressing means.

14. A compressor comprising a horizontal low pressure cylinder, a vertical high pressure cylinder, communicating with said low pressure cylinder, a plunger in said high pressure cylinder, a pawl operatively connected to said plunger, compressing means in said low pressure cylinder including a rotatable drive element, and a pawl and ratchet connection between said plunger and said drive element.

15. A compressor comprising a low pressure cylinder, a high pressure cylinder, said cylinders having a common port interconnecting them, a plunger in said high pressure cylinder for covering said port until the end of the intake stroke, a piston in said low pressure cylinder, and a positive mechanical transmission for advancing said low pressure piston during the intake stroke of said plunger.

In witness whereof, I hereunto subscribe my name this 7th day of November, 1924.

ERNEST W. DAVIS.